(12) United States Patent
Seibert (10) Patent No.: US 10,470,184 B2
(45) Date of Patent: *Nov. 5, 2019

(54) LTE-BASED WIRELESS COMMUNICATION SYSTEM FOR THE M-LMS BAND

(71) Applicant: NextNav, LLC, Sunnyvale, CA (US)

(72) Inventor: Cristina Seibert, Mountain View, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,045

(22) Filed: Jan. 19, 2018

(65) Prior Publication Data

US 2018/0146329 A1 May 24, 2018

Related U.S. Application Data

(63) Continuation-in-part of application No. 15/015,935, filed on Feb. 4, 2016, now Pat. No. 9,913,273.
(Continued)

(51) Int. Cl.
*H04W 72/04* (2009.01)
*H04W 4/02* (2018.01)
(Continued)

(52) U.S. Cl.
CPC ....... *H04W 72/0453* (2013.01); *H04L 5/0007* (2013.01); *H04L 5/0044* (2013.01);
(Continued)

(58) Field of Classification Search
CPC ... H04L 27/2627; H04L 27/2647; H04L 5/00; H04W 4/02; H04W 72/044; H04W 84/042; H04W 88/02
See application file for complete search history.

(56) References Cited

U.S. PATENT DOCUMENTS 8,130,141 B2 *  3/2012  Pattabiraman .......... G01S 19/11
                                                    342/357.29
9,913,273 B2 *  3/2018  Seibert .................... G01S 1/20
(Continued)

OTHER PUBLICATIONS

Chiou et. al. "Ranging Performance of the Positioning Reference Signal in LTE Cellular System." 25th International Meeting of the Satellite Division of the Institute of Navigation. Sep. 2012 (Year: 2012).*

(Continued)

*Primary Examiner* — Kashif Siddiqui (57) ABSTRACT

A receiver capable of receiving and a transmitter capable of transmitting LTE (Long-Term Evolution) signals. The receiver is capable of executing firmware to determine position location from a received LTE-like position waveform over signals modulated on a carrier in a positioning frequency band. In one embodiment the positioning signals are transmitted in a positioning band continuously for up to 100 ms, allowing the receiver to integrate the received positioning signals over a period of up to 100 ms. In one such embodiment, the signals can be integrated coherently for up to 60 ms, assuming acceptable stability of the clock in the receiver and further assuming that less than a predetermined amount of Doppler shift has been introduced in the received signal. The number of physical resource blocks (PRB) can be determined to optimize the signal allocation for the available bandwidth.

19 Claims, 8 Drawing Sheets

Related U.S. Application Data (60) Provisional application No. 62/117,580, filed on Feb. 18, 2015.

(51) Int. Cl.
| | | |
|---|---|---|
| *H04W 64/00* | (2009.01) | |
| *H04L 5/00* | (2006.01) | |
| *H04W 88/02* | (2009.01) | |
| *H04W 84/04* | (2009.01) | |
| *H04L 27/26* | (2006.01) | |

(52) U.S. Cl.
CPC ............ *H04W 4/02* (2013.01); *H04W 64/00* (2013.01); *H04W 72/044* (2013.01); *H04L 27/2647* (2013.01); *H04W 84/042* (2013.01); *H04W 88/02* (2013.01)

(56) References Cited

U.S. PATENT DOCUMENTS

| | | | |
|---|---|---|---|
| 2015/0133171 A1* | 5/2015 | Bani Hani | H04W 4/02 455/456.6 |
| 2015/0318973 A1* | 11/2015 | Wang | H04L 5/0023 370/329 |

OTHER PUBLICATIONS

Information about Related Patents and Patent Applications, see the section attached hereto entitled Related Patents and Patent Applications for further information.
Seibert, U.S. Appl. No. 15/015,935, filed Feb. 4, 2016, US2016-0242157 A1, Aug. 18, 2016.

\* cited by examiner

LTE-BASED WIRELESS COMMUNICATION SYSTEM FOR THE M-LMS BAND

RELATED APPLICATIONS

This application relates to U.S. Patent Application Ser. No. 62/117,580, filed Feb. 18, 2015, entitled AN LTE-BASED WIRELESS COMMUNICATION SYSTEM FOR THE M-LMS BAND, the content of which is hereby incorporated by reference herein in its entirety.

This application relates to U.S. patent application Ser. No. 15/015,935, filed Feb. 4, 2016, entitled AN LTE-BASED WIRELESS COMMUNICATION SYSTEM FOR THE M-LMS BAND, the content of which is hereby incorporated by reference herein in its entirety.

FIELD

Various embodiments relate to wireless communications, and more particularly, to transmitting positioning signals over an M-LMS band from an LTE (Long-Term Evolution) base station.

BACKGROUND

Quickly and accurately estimating the location of things within a geographic area can be very useful. For example, information regarding the location of people or items can be used to speed up emergency response times, track movement of items and people, and link consumers to nearby businesses. Most approaches rely on a process called trilateration. Trilateration uses geometry to estimate the position of an object using distances traveled by different positioning signals (also referred to as "ranging" signals) that are transmitted from three or more transmitters to receivers that are co-located with the object to be located.

Various networks of transmitters have been used to transmit positioning signals. For example, orbiting satellites in the Global Positioning Satellite (GPS) system transmit positioning signals. Each GPS satellite transmits a positioning signal on which a coarse/acquisition code is modulated. The positioning signal is received by a GPS receiver. The GPS receiver identifies the time the positioning signal was transmitted by the satellite. The receiver also determines a relative time of arrival based on an internal clock in the receiver. Once the transmission time and the relative reception times of the positioning signal are known, the receiver uses measurements from at least three satellites to solve a set of simultaneous equations to determine the position and relative clock offset for the receiver.

Unfortunately, GPS signals are very faint, which means that the signals require integration over a very long time for a receiver to acquire a GPS signal and to demodulate enough information from the signal to determine the range measurements necessary to determine the location of the receiver. In many cases, the range measurements are not as accurate as may be desired due to the fact that the signals may take indirect paths from the GPS satellites to the receiver. Acquiring enough information to compute an estimated range measurement associated with a direct path from each GPS satellite to the receiver may take additional time and processing power.

Receiving weak GPS signals in urban environments poses additional problems. Weak GPS signals often cannot reach receivers through buildings. In addition, in such urban environments, GPS signals are more likely to take multiple paths by reflecting off buildings. As noted above, such "multipathing" disrupts a receiver's ability to accurately estimate a range measurement between the receiver and the satellite. One way to address the challenges of determining the position location of a device in an urban environment is to use terrestrial transmitter systems. Such terrestrial transmitter systems provide stronger signals. Furthermore, terrestrial transmitter systems can include transmitters at different locations within the urban environment that reduce the number of instances when there is no direct path between the satellite and the receiver.

Examples of terrestrial transmitter systems that transmit positioning signals are described in U.S. Pat. No. 8,130,141 (the "'141 patent"). In at least one embodiment of the '141 patent, each terrestrial transmitter uses a GPS-like channel to transmit a precisely-timed positioning signal. The receiver computes its location by processing the positioning signals from three or more terrestrial transmitters, similar to the way in which the receiver would process GPS positioning signals from three or more GPS satellites. Since most (if not all) receivers understand how to process GPS signaling, the signals transmitted by such a terrestrial transmitter system can be used by existing receivers with minimal (or no) modifications to those receivers.

Even though terrestrial transmitter systems provide a more-reliable positioning service than GPS, such terrestrial transmitter systems may require a substantial amount of additional infrastructure to transmit the terrestrial positioning signals. Therefore, it would be desirable to reduce the need for such additional terrestrial hardware.

In addition to using terrestrial positioning signals transmitted from stations dedicated to sending such positioning signals, cellular telephones are capable of performing ranging measurements, such as observed time difference of arrival (OTDOA) measurements on cellular telephone signals, such as LTE (Long-Term Evolution) signals. Such signals are transmitted with waveforms organized in resource blocks. Each resource block consists of 7×12 resource elements in the case of normal cyclic prefix. In one embodiment in which an extended cyclic prefix is used, a Physical Resource Block (PRB) only has 6 symbols. A resource element represents the allocation of one symbol in time to one OFDM (Orthogonal Frequency Division Multiplexing) sub-carrier in frequency. A typical LTE waveform is transmitted at a frequency that is different from the frequency of dedicated terrestrial positioning systems, such as systems that conform to the well-known M-LMS industry standard. Typical LTE waveforms used to communicate positioning information comprise 50 resource blocks transmitted over a period of 6 ms. Accordingly, when determining the time difference of arrival of such LTE signals, the received signal is integrated over a period of no more than 6 ms. Restricting the positioning signals to 6 ms reduces the amount of bandwidth consumed by the positioning signals.

While it is advantageous to use LTE signals for ranging due to the ubiquitous nature of the LTE, there are several deficiencies with using the LTE signals for ranging. For one, it would be advantageous to be able to integrate over longer times. In addition, it would be advantageous to have waveforms that conform with a format optimized for position location rather than to a cellular telephone format, such as the signals that are transmitted by M-LMS (Multilateration and Location Monitoring Service) systems.

SUMMARY

Various embodiments described in this disclosure relate generally to methods, systems, means, and machine-readable media for reducing the number of additional terrestrial transmitters required to provide a reliable "position location" system (i.e., a "positioning" system that aids in determining the position of a receiver). Such methods, systems, means and machine-readable media may use pre-existing cellular telephone infrastructure to supplement terrestrial transmitter systems for determining the location of a receiver.

Certain embodiments include a receiver capable of receiving LTE (Long-Term Evolution) signals and capable of executing instructions embodied in firmware, software or the like, in order to determine position location information from a received LTE-like position waveform. In one embodiment, positioning signals are transmitted continuously for what is referred to as a "positioning period" of up to 100 ms, allowing the receiver to integrate the received positioning signals over that positioning period. The positioning signals can be integrated coherently for up to 60 ms, assuming acceptable stability of a clock in the receiver, and further assuming that less than a predetermined amount of Doppler shift has been introduced in the received signal. For integration over a period greater than approximately 60 ms, the integration can be done non-coherently.

Instructions may be executed by a physical layer controller that controls a radio frequency section (RF) of the receiver. Under the control of the firmware, the physical layer controller (i.e., PHY controller) instructs the RF section of the receiver to tune to a center frequency and indicates the number of PRB (physical resource blocks) to be used to generate the waveform. The center frequency is outside the LTE band. In addition, the number of PRBs (each having a bandwidth of 180 kHz (i.e., 12 sub-carriers multiplied by 15 kHz each) determines the bandwidth of the waveform. In one embodiment, the frequency to which the RF section tunes is in the M-LMS (Multilateration and Location Monitoring Service) frequency band. The PHY controller also instructs the RF section to receive the signal in accordance with an LTE-like format that has 40 PRBs for a bandwidth of approximately 7.2 MHz. The resulting signal is then pulse shaped to constrain the signal to the desired frequency mask. In one embodiment, the result of the pulse shaping is a signal having a bandwidth of 8 MHz. Alternatively, the LTE-like format has 37 PRBs for a bandwidth of 6.66 MHz which is pulse shaped to fit within a 7.5 MHz mask.

In one embodiment, an LTE-like format can have other numbers of PRBs, where a PRB is defined according to the LTE standard. Each such PRB includes 12 subcarriers, and each sub-carrier has a bandwidth of approximately 15 kHz and extends for a period of 1 ms (i.e., the duration of an LTE subframe).

A receiver may receive a waveform that includes a number of continuous subframes. The PHY controller may instruct the RF section to receive the number of subframes that are included in the waveform. In one embodiment, the waveform includes up to 100 or more subframes. In another embodiment, the waveform includes 60 subframes and the receiver performs coherent integration on the received signals. In yet another embodiment, the waveform includes 200 subframes. In yet another embodiment, the waveform includes n subframes, where n is greater than a standard number of subframes.

The receiver may also decover the signal, including the PRS (position reference signal) samples, integrating them across the predetermined number of subframes to maximize the strength of the decovered positioning signal.

By using firmware to control the PHY controller, the RF section can be controlled in a way that uses LTE standard PRBs to allow the RF section to generate a new LTE format that is particularly well-suited for generating positioning signals, such as M-LMS signals. Thus, the receiver may operate in accordance with the general operation of an LTE receiver, with the only change being to the firmware to instruct the RF section to generate a new waveform having a non-LTE standard number of PRBs at a non-LTE center frequency for a duration that is greater than the LTE waveform.

A transmitter may be capable of transmitting LTE signals and capable of executing instructions to form LTE-like positioning signals having a duration of greater than 6 ms transmitted at a carrier frequency within a terrestrial positioning system spectrum, such as the spectrum used by M-LMS. In one embodiment, the instructions control the operation of a digital signal processor (DSP) within the physical layer of the transmitter.

In another embodiment, the signals that are transmitted during the positioning period use a different type of modulation that is optimized for the positioning application—e.g., based on direct sequence spread spectrum (DSSS), such as employed in systems currently deployed in the M-LMS band, where LTE-based signals are transmitted at the remaining times.

Details of embodiments are set forth in the drawings and the description below.

BRIEF DESCRIPTION OF THE DRAWINGS

Like reference numbers and designations in the drawings indicate like elements.

DETAILED DESCRIPTION

Figure 1:
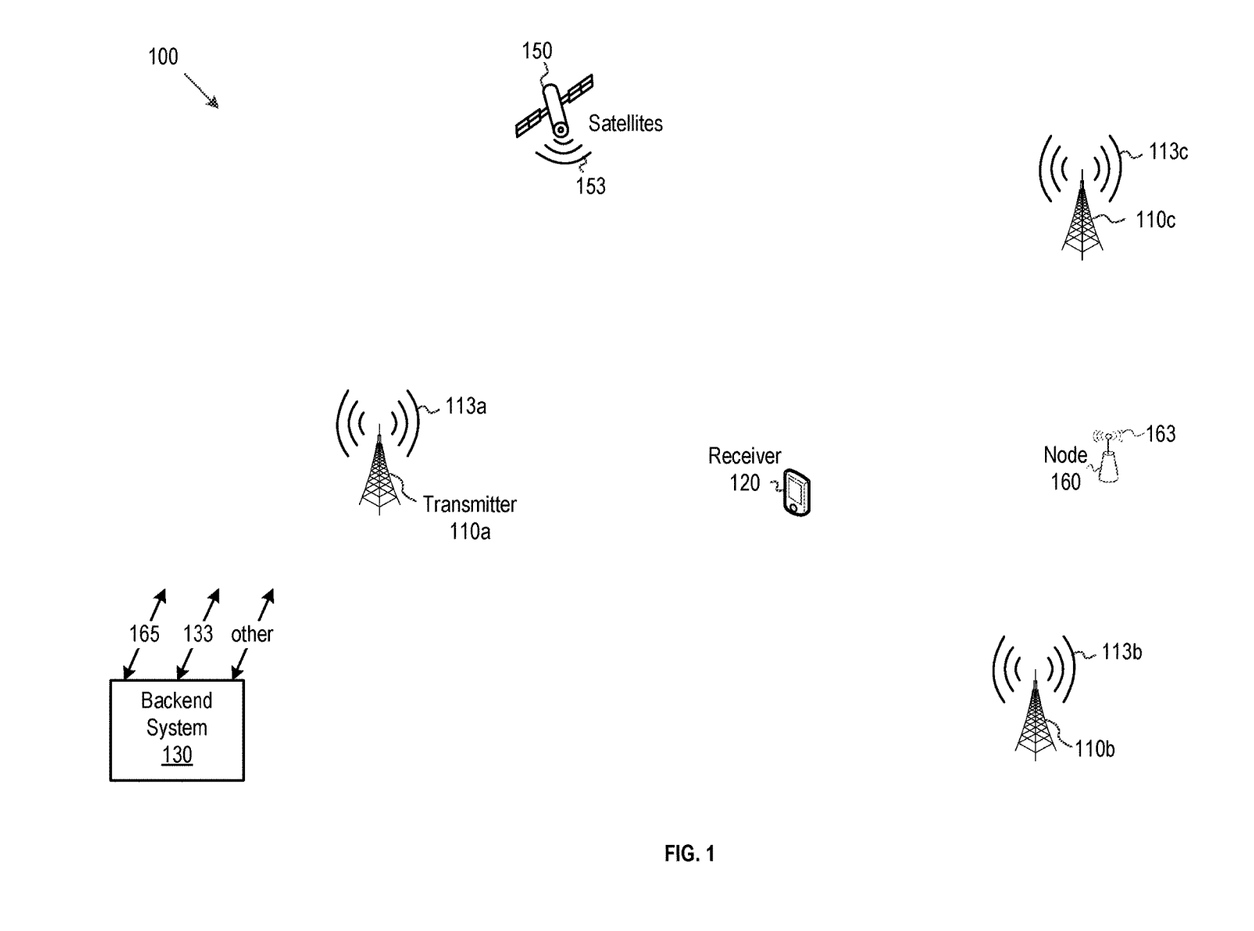
FIG. 1 illustrates a positioning system.

FIG. 1 illustrates a positioning system 100. The positioning system 100 includes any number of receivers, including a receiver 120 that receive signals from transmitters 110, satellites 150, and/or other system nodes 160 via corresponding transmitted communication signals 113, 153 and 163. The receiver 120 may also receive information from a backend system 130 through the transmitters 110 and from other receivers. For the sake of simplicity, the connections between the backend system 130 and each of the transmitters 110 is not shown.

The transmitters 110 may be configured to transmit signals 113 that are received by the receiver 120. The transmitters 110 communicate with the backend 130 via the transmitted communication signals 133. In some embodiments, the transmitters 110 transmit the signals 113 using one or more common multiplexing schemes, such as time multiplexing using different time slots, code division multiplexing using different pseudorandom sequences, or frequency division multiplexing using different frequencies. Each of the signals 113 from each of the transmitters 110 may carry different information that, once extracted by the receiver 120 or the backend 130, may identify the following: (1) the transmitter that transmitted the signal; (2) the latitude, longitude and altitude (LLA) of that transmitter; (3) pressure, temperature and other atmospheric conditions at or near that transmitter; (4) ranging information that is used to measure a distance to that transmitter; and (5) other information. In one embodiment, at least one of the transmitters 110 is an LTE transmitter capable of sending signals in accordance with the LTE (Long Term Evolution) standard.

The receiver 120 may include a location computation engine (not shown) to determine positioning information based on the signals 113, 153, and/or 163 received from the transmitters 110, the satellites 150, and/or the nodes 160. The receiver 120 may include a signal processing component (not shown) that: (1) demodulates the received signals 113, 153, and/or 163; (2) estimates positioning information like travel time of the received signals 113, 153, and/or 163; and (3) uses the positioning information to estimate the position of the receiver 120.

The backend 130 communicates with various other systems, such as the transmitters 110, the receivers 120, and the other networks 160. The backend system 130 may include one or more processor(s), data source(s), and other components (not shown).

One of ordinary skill in the art will appreciate that methods described herein may be carried out using processors at any or all of the transmitters 110, the receivers 120, the backend 130, and other components of the system 100.

Figure 2:
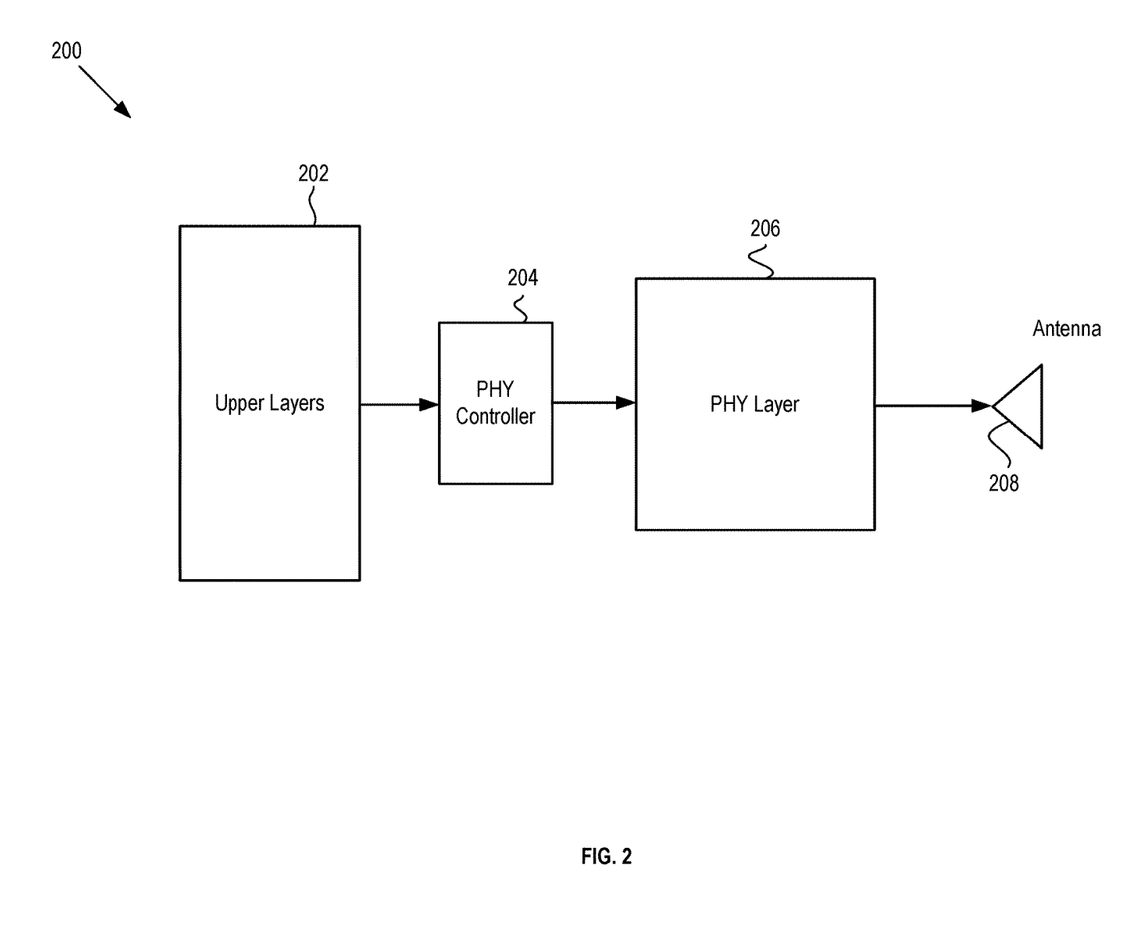
FIG. 2 depicts a simplified block diagram of an LTE transmitter.

FIG. 2 is a simplified block diagram of an LTE transmitter 200. An upper protocol layer module 202 determines the content that is to be transmitted based on information received from another source, such as from a backend system 130 (see FIG. 1) or from a network, such as the internet or a telecommunications network. In one embodiment, the content to be transmitted is positioning information generated locally (i.e., either in a physical layer controller (PHY controller) 204 or upper protocol layers 202 of the receiver 200. Alternatively, the positioning information can be generated at a remote location and provided to the transmitter 200.

In one embodiment in which the information to be transmitted is generated or received by the upper protocol layer 202, the information is provided by the upper protocol layer 202 to the PHY controller 204. The PHY controller 204 determines how much bandwidth is needed to transmit the information. A set of LTE parameters are provided by the PHY controller 204 to the physical layer (PHY layer) 206. In response to the LTE parameters provided to the PHY layer 206 by the PHY controller 204, the PHY layer will modulate the information onto an LTE waveform and couple the LTE waveform to a transmission antenna 208. The current LTE standard defines positioning reference signals (PRS) that are transmitted in band (i.e., at the same frequency as the voice information). Accordingly, the LTE standard places a limit on the duration of the PRS signal. In one embodiment, the PRS signals are transmitted in a positioning frequency band that is distinct from the band used to communicate other information (e.g., voice and other non-position location related data).

Figure 3:
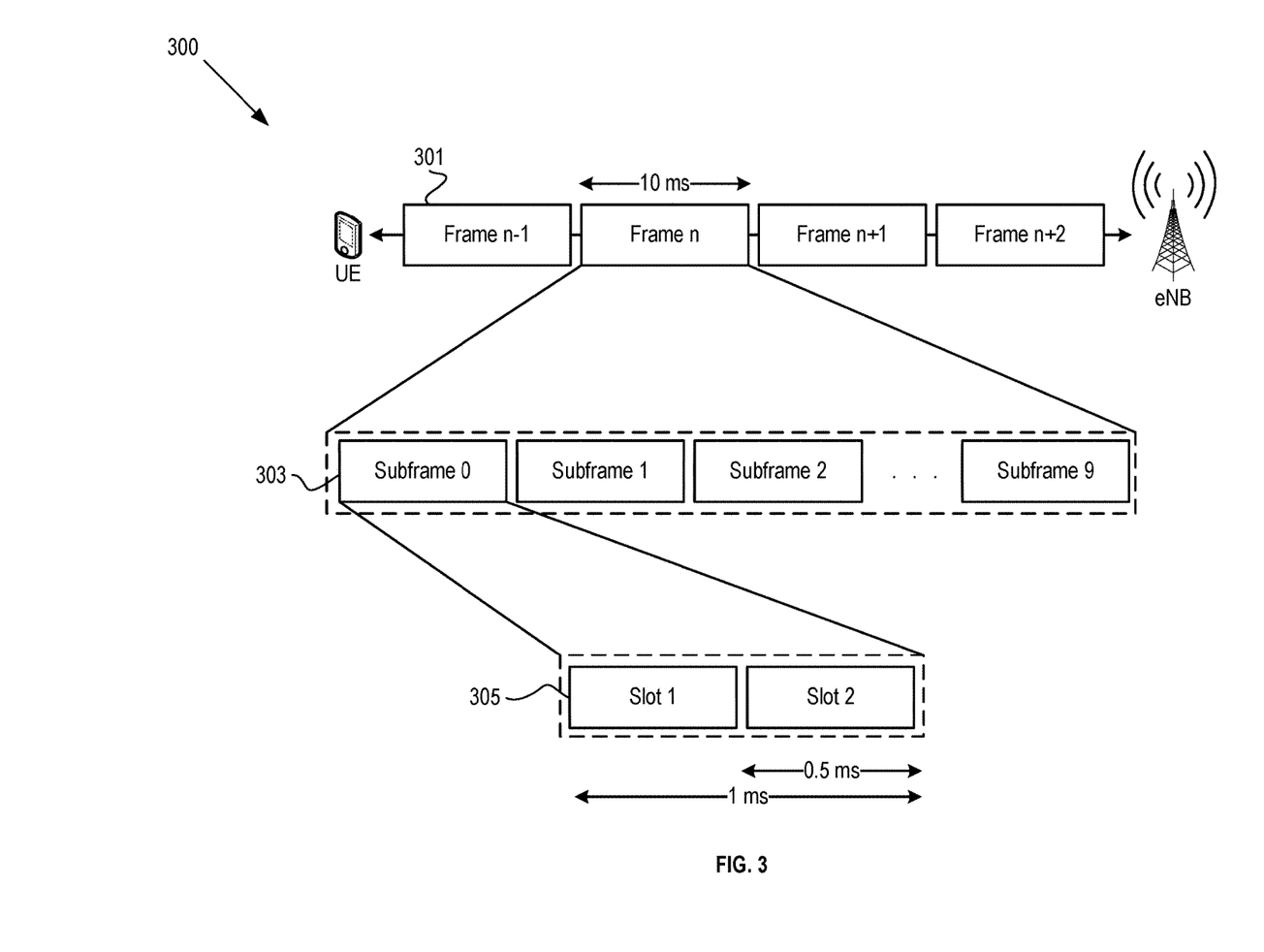
FIG. 3 illustrates of one embodiment of the structure of a waveform.

FIG. 3 illustrates the structure of an LTE waveform 300. An LTE waveform is organized as frames 301. Each of the frames 301 is ten milliseconds (ms) long, and comprises ten subframes 303. Each of the subframes 303 is one ms long, and comprises two slots 305 of 0.5 ms each. While a frame is ten ms long, the LTE standard limits PRS signals to a maximum of 6 subframes (i.e., 6 ms). Positioning signals that conform to this structure are "covered" or "spread" with a pseudo-random number (PRN) code sequence based on a "gold code" sequence.

Figure 4:
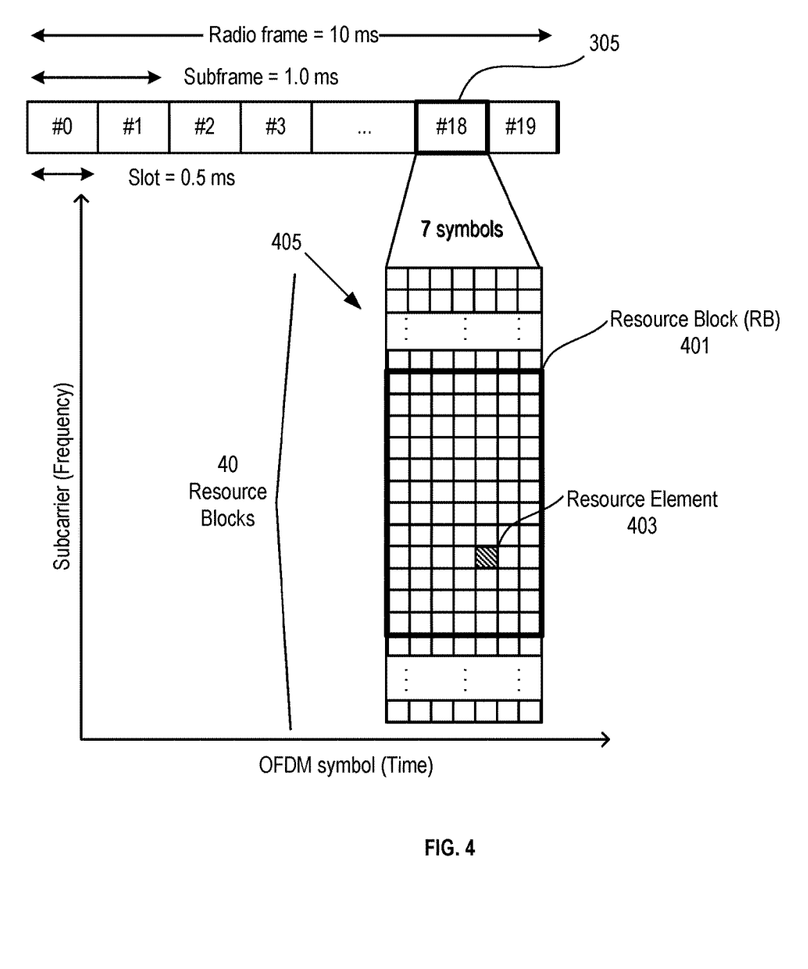
FIG. 4 shows additional details regarding the structure of an LTE waveform.

FIG. 4 shows additional details regarding the structure of an LTE waveform 300. Each of the slots 305 can be used to transmit a number of physical resource blocks (PRBs) 401. Each PRB 401 has a duration of 7 symbols in time and is 12 subcarriers wide in frequency (i.e., 7×12 resource elements). Each subcarrier is 15 kHz wide. A resource element 403 represents the allocation of one symbol in time to one subcarrier in frequency. Accordingly, each PRB 401 comprises 84 resource elements 403. A typical LTE waveform used for cellular telephone communications has 50 PRBs centered at frequencies allocated by the Federal Communications Commission (FCC).

When the PHY controller 204 instructs the PHY layer 206 to transmit information, the parameters that the PHY controller 204 provides the PHY layer 206 include: (1) the center frequency at which the LTE waveform is to be transmitted (i.e., the positioning frequency band carrier frequency); (2) the number of resource blocks that will be used in the waveform and (3) the number of subframes to be continuously transmitted.

Figure 5:
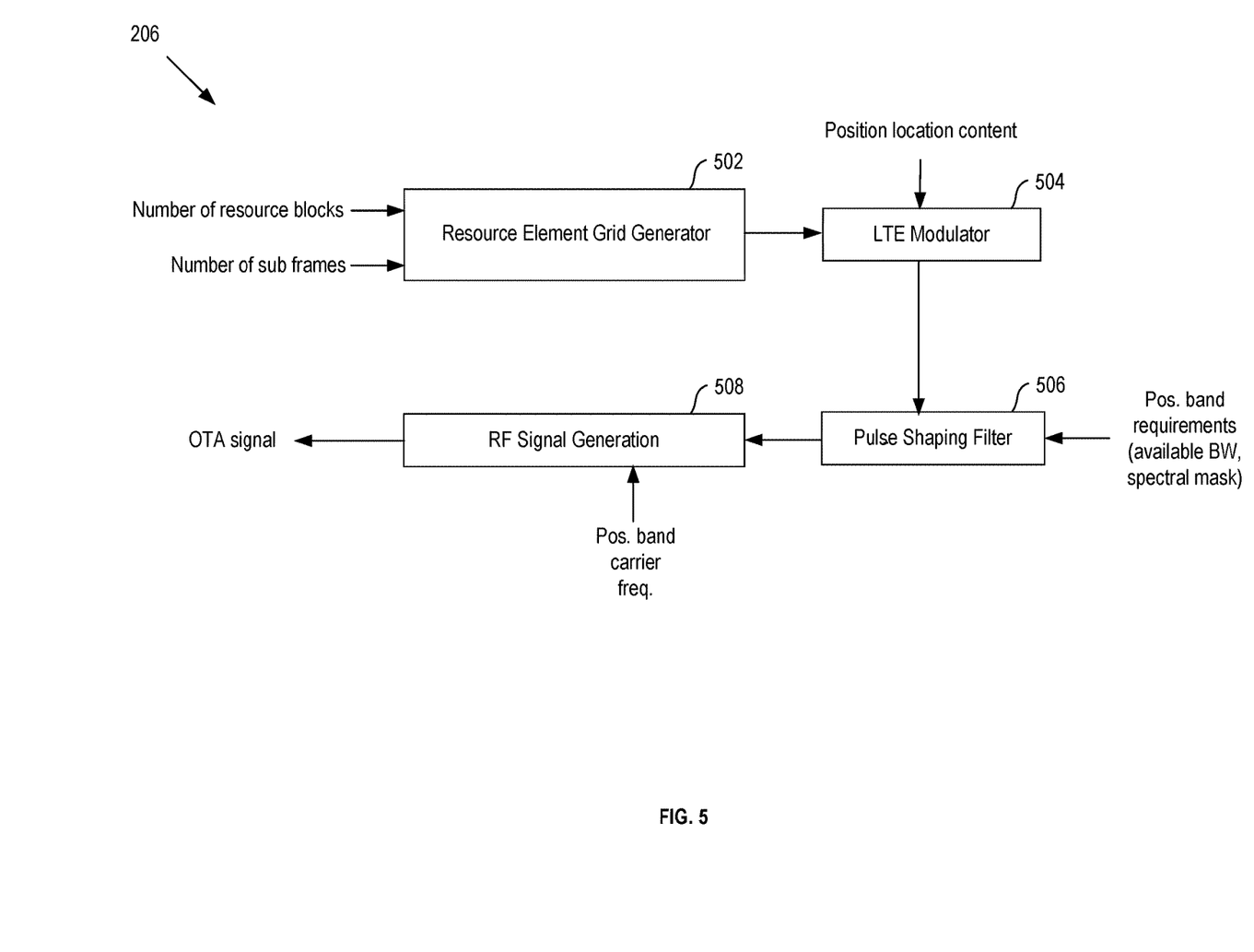
FIG. 5 depicts a simplified functional block diagram of the PHY layer of a transmitter.

FIG. 5 is a simplified functional block diagram of the PHY layer 206 in one embodiment. The number of PRBs and subframes to be used are provided to the PHY layer 206 by the PHY controller 204 (see FIG. 2). For each of the slots 305, a Resource Element Grid Generator (REGG) 502 generates a resource element grid 405 based on the information provided by the PHY controller 204. In one embodiment, each of the slots 305 includes 40 PRBs 401.

In one embodiment, the REGG 502 is a digital signal processor (DSP) that generates a signal having a bandwidth determined by the number of the PRBs 401 to be included in the grid 405. Alternatively, the REGG 502 is an analog signal processor or module comprising discrete components capable of generating the grid 405.

The generated grid 405 is coupled to an LTE modulator 504. The LTE modulator 504 modulates position location content to be transmitted onto the signals of the generated grid 405. In one embodiment, the content is modulated using OFDM (Orthogonal Frequency Division Multiplexing) modulation. An output of the LTE modulator 504 is coupled to a pulse shaping filter module 506 that pulse shapes the signal to be transmitted to fit the waveform into a desired mask. The mask is determined based on the position frequency band requirements provided by the PHY controller 204. The position frequency band requirements include the available bandwidth and the spectral mask to be used. In one embodiment, these requirements are dictated by an industry standard. In one embodiment in which the bandwidth of the positioning signal is 8 MHz, 40 PRBs 401 are used to generate the grid 405. In an alternative embodiment, the positioning signal bandwidth is 7.5 MHz, in which case 37 PRBs are used to generate the grid 405. The output from the filter 506 is coupled to an RF signal generator 508. The RF signal generator 508 up-converts the signal to the position location carrier frequency. In one embodiment, the M-LMS band is used to transmit positioning signals using a waveform that is similar to the LTE waveform, but having a non-LTE carrier frequency, a number of PRBs that differ from the LTE waveform, and being transmitted with up to 200 or more subframes. It should be noted that as a consequence of the pulse shaping of the filter 506, the output to the RF signal generator 508 will have an 8 MHz bandwidth, even though the generated grid is 40×180 kHz=7.2 MHz.

Figure 6:
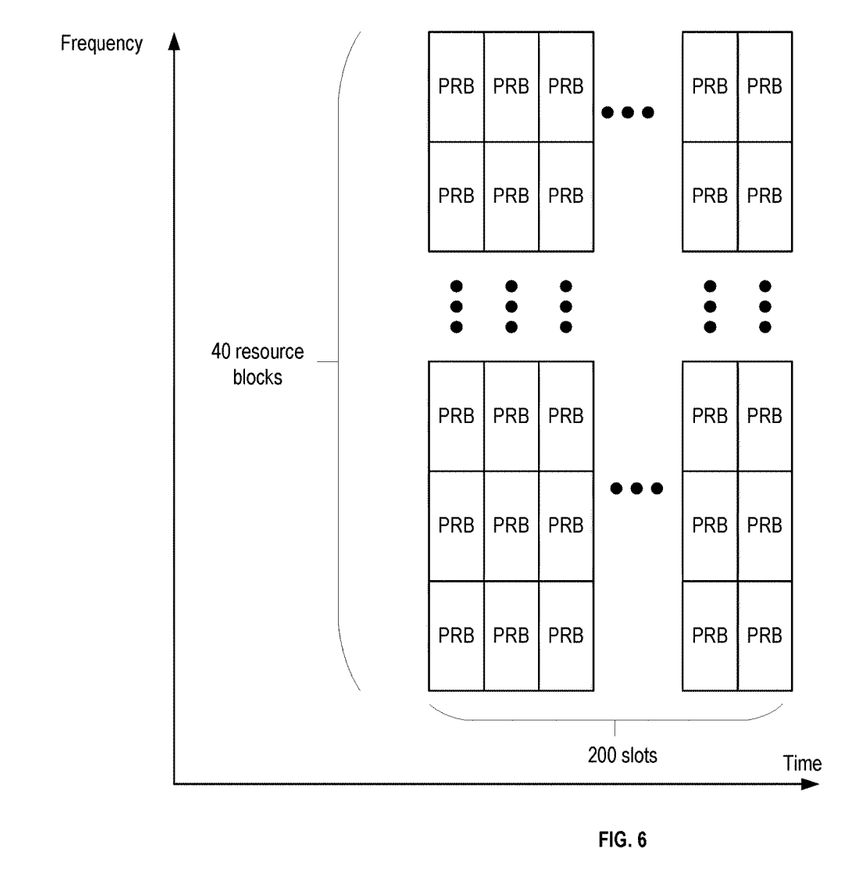
FIG. 6 illustrates an LTE waveform where there are 40 PRBs in each slot.

FIG. 6 is an illustration of an LTE waveform generated in one embodiment in which there are 40 PRBs in each slot. In one such embodiment, 100 continuous subframes (having 200 slots) are transmitted together. In another embodiment, the number of subframes that are transmitted together can vary depending upon the conditions under which signals are being transmitted. Under conditions that are more challenging for the receivers, a greater number of subframes can be transmitted. For example, when the transmitter is operating in an urban environment, a relatively large number of subframes can be transmitted together. In one such embodiment, 200 or more subframes can be transmitted in a very challenging environment. In a less challenging environment, 60 continuous subframes or less are transmitted together. By continuously transmitting more subframes, the receiver can integrate over a longer period, increasing the sensitivity of the receiver.

Figure 7:
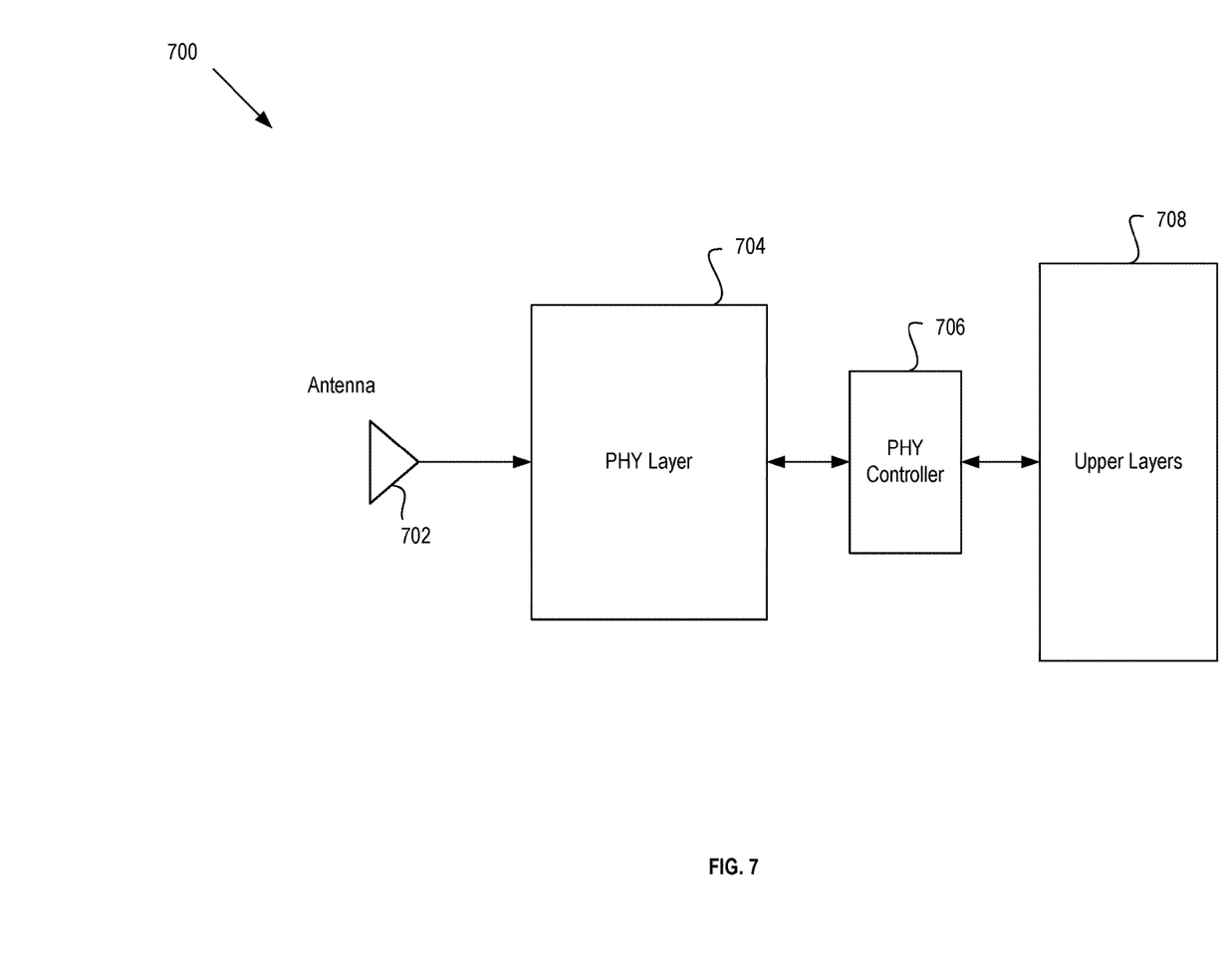
FIG. 7 depicts a simplified block diagram of a receiver that is capable of receiving positioning signals in a positioning frequency band.

FIG. 7 is a simplified block diagram of a receiver 700 in one embodiment. Signals transmitted from an LTE transmitter 200 are received in an antenna 702. The output from the antenna 702 is coupled to a PHY layer 704. The PHY layer 704 receives control signals from a PHY controller 706. The control signals indicate the structure of the waveform to be received, including the frequency of the carrier, the number of subframes 303 over which the received signal will be integrated, and the number of PRBs 401 to be received. As noted above in relation to one embodiment, the signals are received in the M-LMS band. Alternatively, the signals can be received at other frequencies appropriate for transmission and reception of positioning signals. For signals that are received with 200 or more subframes, the receiver can integrate the received signal over the entire period of 200 or more milliseconds. In one such embodiment in which the received signal has a bandwidth of approximately 8 MHz, the PHY controller 706 instructs the PHY layer 704 that there are 40 PRBs in each slot. Alternatively, the received signal may have a bandwidth of 7.5 MHz, in which case, the PHY controller 706 will instruct the PHY layer 704 that there are 37 PRBs in the received signal. It will be understood by those skilled in the art that the particular number of PRBs to be received may depend upon the number of PRBs in the transmitted signals. The number of PRBs, in turn, depends upon the bandwidth of the signal to be transmitted and the filter used within the transmitter to pulse shape the signal prior to up-converting the signal to the carrier frequency.

Figure 8:
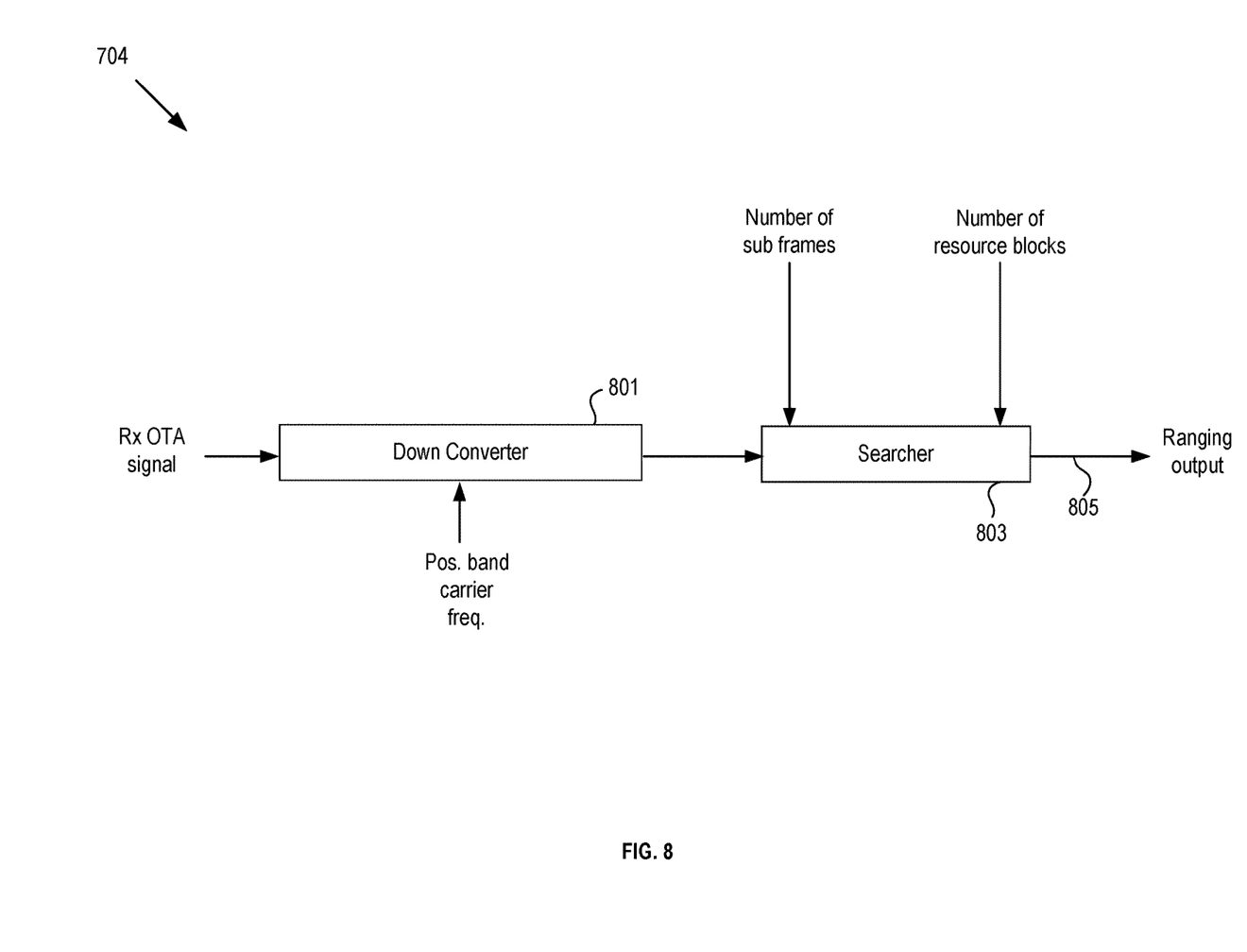
FIG. 8 depicts a simplified functional block diagram of the PHY layer of the receiver.

FIG. 8 is an exemplary simplified block diagram of a PHY layer 704. The received over-the-air (OTA) signals are coupled from the antenna 702 (see FIG. 7) to a receiver down converter 801 within the PHY layer 704. The output of the down converter 801 is coupled to a searcher 803. The searcher 803 also receives signals from the PHY controller 706. The signals from the PHY controller 706 indicate the number of subframes that have been continuously transmitted and the number of PRBs in each slot of each subframe. The searcher 803 uses the number of PRBs to set the parameter for a PRS. In one embodiment, the PRS includes a gold code that is OFDM encoded into the PRBs of the received signal. Finding the gold code provides a means to determine the relative distance (i.e., range) from the transmitter to the receiver.

In addition, the searcher 803 uses the number of subframes to determine how long to integrate the signal received from the down converter 801. By receiving a signal that has a relatively large number of continuously transmitted PRBs, the integration period of the searcher can be relatively long. Increasing the length of the integration period improves the sensitivity of the receiver. The output of the searcher 803 is a ranging output 805 that can be used to determine the relative distance between the transmitter and the receiver.

Examples of Other Features in Some Embodiments

Functionality and operation disclosed herein may be embodied as one or more methods implemented, in whole or in part, by machine(s)—e.g., processor(s), computers, or other suitable means known in the art—at one or more locations, which enhances the functionality of those machines, as well as computing devices that incorporate those machines. Non-transitory machine-readable media embodying program instructions adapted to be executed to implement the method(s) are also contemplated. Execution of the program instructions by one or more processors cause the processors to carry out the method(s). Systems (e.g., apparatuses or components thereof) operable to implement the method(s) are also contemplated.

It is noted that method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency.

By way of example, not by way of limitation, method(s), system(s) or other means may perform the following or be operable perform the following: generating a grid of resource elements, the resource elements within the grid being grouped into physical resource blocks (PRBs); organizing the PRBs in slots, each slot having a number of the PRBs; and transmitting a plurality of the slots in a continuous transmission at a frequency within a frequency band allocated for determining position.

In different embodiments, the number of PRBs is 40 or 37. In at least one embodiment, the slot is 0.5 milliseconds in duration. In at least one embodiment, each PRB comprises 7×12 resource elements. In different embodiments, slots are transmitted in at least 60 consecutive subframes, at least 100 consecutive subframes, or at least 200 consecutive subframes.

In at least one embodiment, each resource element represents an allocation of one symbol in time to one OFDM (Orthogonal Frequency Division Multiplexing) sub-carrier in frequency. In at least one embodiment, each resource element represents an allocation of one symbol in time to one LTE OFDM (Orthogonal Frequency Division Multiplexing) sub-carrier in frequency.

In at least one embodiment, the frequency band allocated for transmitting positioning signals is an M-LMS (Multilateration and Location Monitoring Service) band.

Method(s), system(s) or other means may further or alternatively perform the following or be operable to perform the following: transmitting a Long Term Evolution (LTE) signal over another frequency allocated by the Federal Communications Commission (FCC) for use by cellular telephones.

By way of example, not by way of limitation, method(s), system(s) or other means may perform the following or be operable perform the following: generating a grid of resource elements, the resource elements within the grid being grouped into physical resource blocks (PRBs); receiving an Orthogonal Frequency Division Multiplexing (OFDM) modulated positioning signal on a frequency for transmitting positioning signals; and searching for positioning information within the received positioning signal using the parameters of the generated grid of resource elements as search parameters, where the resource elements used for positioning information are contiguous.

In different embodiments, the grid of resource elements includes 40 or 37 PRBs that are grouped together in a slot. In at least one embodiment, the slot is 0.5 milliseconds in duration. In at least one embodiment, each PRB comprises 7×12 resource elements.

In at least one embodiment, each resource element represents the allocation of one symbol in time to one OFDM sub-carrier in frequency. In at least one embodiment, each resource element represents an allocation of one symbol in time to one LTE OFDM (Orthogonal Frequency Division Multiplexing) sub-carrier in frequency.

In at least one embodiment, each resource element represents the allocation of one symbol in time to one OFDM sub-carrier in frequency.

In different embodiments, searching for position information includes integrating the received signal over at least 60 consecutive subframes, at least 100 consecutive subframes, or at least 200 consecutive subframes.

In at least one embodiment, the frequency band is an M-LMS (Multilateration and Location Monitoring Service) band.

By way of example, one or more systems may comprise hardware modules that perform the methods or particular steps of the methods disclosed herein.

In accordance with certain embodiments, a transmitter for transmitting positioning signals includes: a resource element grid generator (REGG) having first and second inputs and an output, the first input coupled to receive a signal indicating a number of physical resource blocks (PRBs) to be included in a generated grid of resource elements, and the second input coupled to receive a signal indicating a number of subframes to be consecutively transmitted by the transmitter; a modulator having a first input and an output, wherein the first input is coupled to the output of the REGG to receive a signal having a number of PRBs together in a slot and the signal having a number of slots to be consecutively transmitted from the transmitter; and a radio frequency (RF) signal generator having a first input coupled to the output of the modulator to receive a modulated waveform from the modulator, the modulated waveform having a number of consecutive slots to be contiguously transmitted at a frequency within a frequency band for transmitting a positioning signal.

The transmitter may further comprise: a physical layer (PHY) controller, the PHY controller having a first output coupled to the first input of the REGG to provide the signal indicating the number of physical resource blocks (PRBs) to be included in the generated grid of resource elements, the PHY controller having a second output coupled to the second input of the REGG to provide the signal indicating the number of subframes to be consecutively transmitted by the transmitter.

In at least one embodiment, the modulator has a second input coupled to the PHY controller to receive position location content to be modulated on the signal received from resource element grid generator.

In at least one embodiment, the RF signal generator has second input to receive information regarding a carrier frequency to be used for transmitting the positioning signals.

In different embodiments, the received signal indicating the number of PRBs to be included in the generated grid of resource elements indicates that 40 or 37 PRBs are to be included in the generated grid of resource elements. In at least one embodiment, each PRB comprises 7×12 resource elements.

In at least one embodiment, each resource element represents the allocation of one symbol in time to one OFDM sub-carrier in frequency. In at least one embodiment, each resource element represents the allocation of one symbol in time to one OFDM sub-carrier in frequency.

In different embodiments, the received signal indicating the number of subframes to be consecutively transmitted by the transmitter indicates that the number of subframes to be consecutively transmitted is 60, 100 or 200.

In at least one embodiment, the frequency band allocated by the FCC for transmitting positioning signals is an M-LMS (Multilateration and Location Monitoring Service) band.

In accordance with certain embodiments, a receiver of positioning signals includes: a down converter having a first input to receive an Orthogonal Frequency Division Multiplexing (OFDM) modulated positioning signal, the down converter having a second input to receive information regarding a carrier frequency of the received positioning signal; and a searcher having a first input coupled to receive a signal indicating a number of physical resource blocks (PRBs) to be included in a search for position information within the received positioning signal, and having a second input coupled to receive a signal indicating a number of subframes over which the searcher is to integrate the received positioning signal in performing the search for positioning information.

In different embodiments, the received positioning signal comprises a plurality of consecutively transmitted slots, each slot of the received positioning signal having 40 or 37 PRBs. In different embodiments, the signal indicating the number of PRBs indicates that there are 40 or 37 PRBs in each slot of the received positioning signal.

In different embodiments, the received positioning signal comprises 60, 100 or 200 subframes. In different embodiments, the signal indicating the number of subframes indicates that the search is to integrate across 60, 100 or 200 subframes of the received signal. In at least one embodiment, each PRB comprises 7×12 resource elements.

In at least one embodiment, each resource element represents the allocation of one symbol in time to one OFDM sub-carrier in frequency. In at least one embodiment, each resource element represents the allocation of one symbol in time to one OFDM sub-carrier in frequency.

In at least one embodiment, each module includes one or more inputs to receive information used to perform what it is operable to do, and further includes one or more outputs to send information to other modules.

A "receiver" may be in the form of a computing device (e.g., a mobile phone, a tablet, a PDA, a laptop, a digital camera, a tracking tag). A receiver may also take the form of any component of the computer, including a processor. Processing by the receiver can also occur at a server.

The illustrative methods described herein may be implemented, performed, or otherwise controlled by suitable hardware known or later-developed by one of skill in the art, or by firmware or software executed by processor(s), or any combination of hardware, software and firmware. Software may be downloadable and non-downloadable at a particular system. Such software, once loaded on a machine, changes the operation of that machine.

Systems on which methods described herein are performed may include one or more means that implement those methods. For example, such means may include processor(s) or other hardware that, when executing instructions (e.g., embodied in software or firmware), perform any method step disclosed herein. A processor may include, or be included within, a computer or computing device, a controller, an integrated circuit, a "chip", a system on a chip, a server, other programmable logic devices, other circuitry, or any combination thereof.

"Memory" may be accessible by a machine (e.g., a processor), such that the machine can read/write information from/to the memory. Memory may be integral with or separate from the machine. Memory may include a non-transitory machine-readable medium having machine-readable program code (e.g., instructions) embodied therein that is adapted to be executed to implement any or all of the methods and method steps disclosed herein. Memory may include any available storage media, including removable, non-removable, volatile, and non-volatile media—e.g., integrated circuit media, magnetic storage media, optical storage media, or any other computer data storage media. As used herein, machine-readable media includes all forms of machine-readable media except to the extent that such media is deemed to be non-statutory (e.g., transitory propagating signals).

All of the information disclosed herein may be represented by data, and that data may be transmitted over any communication pathway using any protocol, stored on data source(s), and processed by a processor. Transmission of data may be carried out using a variety of wires, cables, radio signals and infrared light beams, and an even greater variety of connectors, plugs and protocols even if not shown or explicitly described. Systems may exchange information with each other using any communication technology. Data, instructions, commands, information, signals, bits, symbols, and chips and the like may be represented by voltages, currents, electromagnetic waves, magnetic fields or particles, or optical fields or particles.

Features in system figures that are illustrated as rectangles may refer to hardware, firmware or software. It is noted that lines linking two such features may be illustrative of data transfer between those features. Such transfer may occur directly between those features or through intermediate features. Where no line connects two features, transfer of data between those features is contemplated unless otherwise stated.

When two things (e.g., modules, circuit elements, etc.) are "coupled to" each other, those two things may be directly connected together, or may be separated by one or more intervening things. Thus, no direct connection is required between the two things. Where an output and an input are coupled to each other, data and/or signaling sent from the output is received by the input even if the data passes through one or more intermediate things.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

It is noted that the term "GPS" may refer to any Global Navigation Satellite Systems (GNSS), such as GLONASS, Galileo, and Compass/Beidou, and vice versa.

The invention claimed is:

1. A method for transmitting positioning signals, the method comprising:
generating a grid of resource elements, the resource elements within the grid being grouped into physical resource blocks (PRBs);
organizing the PRBs in slots, each slot having a number of the PRBs; and
transmitting a signal used for positioning in at least 120 contiguous slots in a continuous transmission at a frequency within a frequency band allocated for determining position, wherein transmitting the slots includes transmitting the slots in at least 60 consecutive subframes.

2. The method of claim 1, wherein the number of the PRBs is 37 or 40, and each PRB comprises 7×12 resource elements.

3. The method of claim 1, wherein each resource element represents an allocation of one symbol in time to one LTE OFDM (Orthogonal Frequency Division Multiplexing) sub-carrier in frequency.

4. The method of claim 1, wherein the frequency band is an M-LMS (Multilateration and Location Monitoring Service) band.

5. The method of claim 1, further comprising: transmitting a Long Term Evolution (LTE) signal over another frequency allocated by the Federal Communications Commission (FCC) for use by cellular telephones.

6. A method for receiving positioning signals, the method comprising:
generating a grid of resource elements, the resource elements within the grid being grouped into physical resource blocks (PRBs);
receiving an Orthogonal Frequency Division Multiplexing (OFDM) modulated positioning signal on a frequency within a frequency band allocated for transmitting positioning signals; and
searching for positioning information within the received positioning signal using the parameters of the generated grid of resource elements as search parameters, where multiple resource elements used for the positioning information are contiguous and received after being continuously transmitted.

7. The method of claim 6, wherein the grid of resource elements includes 37 or 40 PRBs that are grouped together in a slot, and each PRB comprises 7×12 resource elements, wherein the frequency band is an M-LMS (Multilateration and Location Monitoring Service) band, and wherein each resource element represents an allocation of one symbol in time to one LTE OFDM (Orthogonal Frequency Division Multiplexing) sub-carrier in frequency.

8. The method of claim 6, wherein each resource element represents an allocation of one symbol in time to one LTE OFDM (Orthogonal Frequency Division Multiplexing) sub-carrier in frequency.

9. The method of claim 6, wherein searching for position information includes integrating the received signal over at least 60 consecutive subframes, wherein the frequency band is an M-LMS (Multilateration and Location Monitoring Service) band, and wherein each resource element represents an allocation of one symbol in time to one LTE OFDM (Orthogonal Frequency Division Multiplexing) sub-carrier in frequency.

10. The method of claim 6, wherein the frequency band is an M-LMS (Multilateration and Location Monitoring Service) band.

11. A positioning system comprising:
a transmitter that includes:
a resource element grid generator (REGG) having first and second inputs and an output, the first input coupled to receive a signal indicating a number of physical resource blocks (PRBs) to be included in a generated grid of resource elements, and the second input coupled to receive a signal indicating a number of subframes to be consecutively transmitted by the transmitter;
a modulator having a first input and an output, wherein the first input is coupled to the output of the REGG to receive a signal having a number of PRBs together in a slot and the signal having a number of slots to be consecutively transmitted from the transmitter; and
a radio frequency (RF) signal generator having a first input coupled to the output of the modulator to receive a modulated waveform from the modulator, the modulated waveform having a number of consecutive slots to be contiguously transmitted in a continuous transmission at a frequency within a frequency band for transmitting a positioning signal.

12. The system of claim 11, wherein the transmitter further includes: a physical layer (PHY) controller, the PHY controller having a first output coupled to the first input of the REGG to provide the signal indicating the number of physical resource blocks (PRBs) to be included in the generated grid of resource elements, the PHY controller having a second output coupled to the second input of the REGG to provide the signal indicating the number of subframes to be consecutively transmitted by the transmitter, wherein the modulator has a second input coupled to the PHY controller to receive position location content to be modulated on the signal received from resource element grid generator.

13. The system of claim 11, wherein the RF signal generator has second input to receive information regarding a carrier frequency to be used for transmitting the positioning signal.

14. The system of claim 11, wherein the received signal indicating the number of PRBs to be included in the generated grid of resource elements indicates that 37 or 40 PRBs are to be included in the generated grid of resource elements, and wherein each PRB comprises 7×12 resource elements, wherein the frequency band is an M-LMS (Multilateration and Location Monitoring Service) band, and wherein each resource element represents an allocation of one symbol in time to one LTE OFDM (Orthogonal Frequency Division Multiplexing) sub-carrier in frequency.

15. The system of claim 14, wherein each resource element represents the allocation of one symbol in time to one OFDM sub-carrier in frequency.

16. The system of claim 11, wherein the received signal indicating the number of subframes to be consecutively transmitted by the transmitter indicates that the number of subframes to be consecutively transmitted is 60, wherein the frequency band is an M-LMS (Multilateration and Location Monitoring Service) band, and wherein each resource element represents an allocation of one symbol in time to one LTE OFDM (Orthogonal Frequency Division Multiplexing) sub-carrier in frequency.

17. The system of claim 11, wherein the frequency band is an M-LMS (Multilateration and Location Monitoring Service) band.

18. The system of claim 11, the system further comprising:
a receiver that includes:
a down converter having a first input to receive an Orthogonal Frequency Division Multiplexing (OFDM) modulated positioning signal, the down converter having a second input to receive information regarding a carrier frequency of the received positioning signal; and
a searcher having a first input coupled to receive a signal indicating a number of physical resource blocks (PRBs) to be included in a search for position information within the received positioning signal, and having a second input coupled to receive a signal indicating a number of subframes over which the searcher is to integrate the received positioning signal in performing the search for positioning information.

19. The system of claim 18, wherein the received positioning signal comprises a plurality of consecutively transmitted slots, wherein each slot of the received positioning signal having 37 or 40 PRBs, wherein the signal indicating the number of PRBs indicates that there are 37 or 40 PRBs in each slot of the received positioning signal, and wherein each PRB comprises 7×12 resource elements.

* * * * *